United States Patent
Scott

[15] 3,685,196
[45] Aug. 22, 1972

[54] SELF-RELEASING ATTACHMENT DEVICE FOR FISHING

[72] Inventor: John Grayson Scott, 2401 Monroe St., Paducah, Ky. 42001

[22] Filed: Nov. 13, 1969

[21] Appl. No.: 870,130

[52] U.S. Cl. ............................................. 43/43.12
[51] Int. Cl. ........................ A01k 91/02, A01k 95/00
[58] Field of Search .................... 43/43.12; 116/118 A

[56] References Cited

UNITED STATES PATENTS

| | | | |
|---|---|---|---|
| 2,814,902 | 12/1957 | Matteson | 43/43.12 |
| 2,308,238 | 1/1943 | Baker | 43/43.12 |
| 2,460,526 | 2/1949 | Oliver | 43/43.12 |
| 2,713,743 | 7/1955 | Stark | 43/43.12 |
| 3,393,467 | 7/1968 | Potter et al. | 43/43.12 |
| 3,415,005 | 12/1968 | Gilham | 43/43.12 |
| 3,513,583 | 5/1970 | Leash et al. | 43/43.12 |

*Primary Examiner*—Hugh R. Chamblee

[57] ABSTRACT

An attachment device for utilization with a casting plug or other type of fishing lure is provided that enables a fisherman to greatly extend the distance of his cast. The device includes a water-soluble perforated disc-like pellet having string ends extended therefrom for adhesive attachment to a preselected bait or sinker element. The device is preferably attached to a fishing line by slipping the pellet over the end of a fish hook appended to the lure or line. Dissolution of the pellet, when the lure is cast into the water, releases the device from the lure whereupon the lure can be retrieved by the fisherman reeling in his line in the usual manner.

5 Claims, 8 Drawing Figures

PATENTED AUG 22 1972 3,685,196
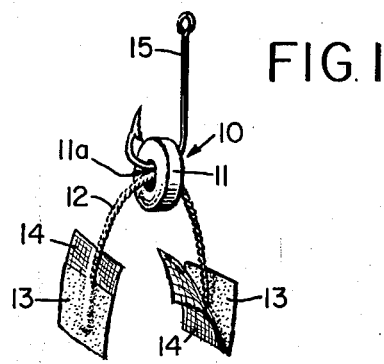
FIG. 1
FIG. 2
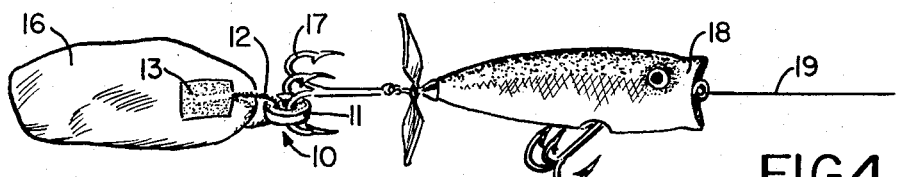
FIG. 3
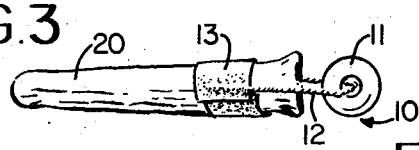
FIG. 4
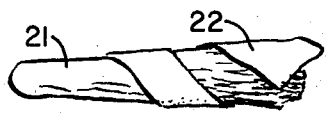
FIG. 5
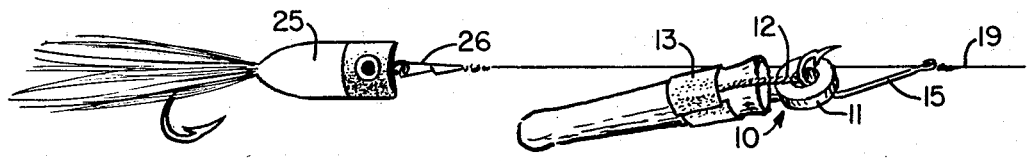
FIG. 6
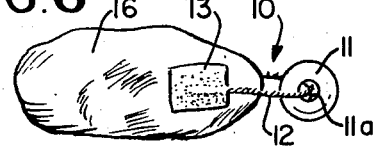
FIG. 7
FIG. 8
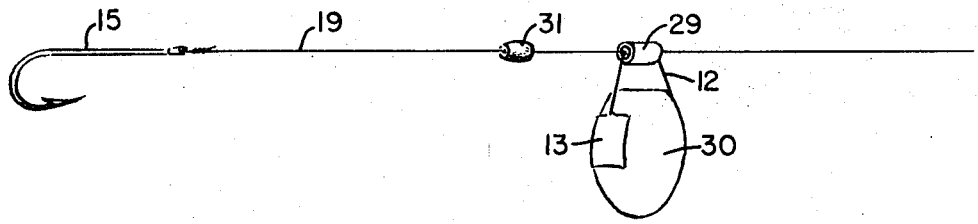
John Grayson Scott
INVENTOR

SELF-RELEASING ATTACHMENT DEVICE FOR FISHING

BACKGROUND OF THE INVENTION

The experienced fisherman is aware that a fish is more easily influenced to strike a lure that is comparatively small and light in weight. However, even an amateur fisherman soon learns that casting a small and particularly light weight lure for any great distance is a difficult task requiring no little skill even when sophisticated spinning tackle is employed. Although casting distance can be improved by using an exceptionally heavy lure or by a sinker tied to the line, this is obviously an undesired expedient that greatly reduces the effectiveness of the lure particularly in regard to the lure's attractiveness to fish during its retrieval through the water.

Attempts have been made in the past to solve the problem heretofore presented by provision of a self-releasing weighted means for use in combination with a lure whereby the weight is released to sink to the bottom at the completion of the cast and the lure is then separately pulled back through the water. Examples in the prior art of attempts to solve this problem are set forth in U.S. Pat. Nos. 3,077,694 and 3,081,574. Notwithstanding these noteworthy contributions to the art it is believed that a need exists for a self-discarding attachment device for use in conjunction with a fishing lure that is comparatively simple in construction whereby it may be quite easily and inexpensively mass produced.

The present invention, therefore, comprehends as a primary objective an improved construction for an attachment device for use in line fishing that provides needed casting weight in accordance with the relative weight of the fishing lure to be utilized, in a construction that can be relatively inexpensively produced and made available in quantity at low cost to fishermen.

A further objective of the present invention is the provision of a more versatile fishing lure attachment device that will lend itself for use in all types of line fishing in combination with any one of a myriad selection of distinctly different lures or baits now available.

SUMMARY OF THE INVENTION

This invention relates generally to line-attached fishing lures, and attachments therefor. More specifically, the invention pertains to an improved and simplified construction for a self-releasing weight attachment device adapted to be secured to the end of a fishing line to increase the distance casting ability of a fisherman. The device includes a substantially small water-soluble disc-shaped pellet or tablet having a central perforation therethrough to enable it to be easily slipped onto the shank of a fishing hook. A flexible means, preferably in the form of a substantially thin string or leader is passed through the perforation of the pellet whereby the two ends of the string extend therefrom and the string is free to slide through the pellet. Each end of the string is provided with means for adhering it to a selected non-buoyant weight or sinker element. Preferably, each end of the string is provided with a tab having an adhesive coating or composition on one side thereof for adhering both to the end of the string and to the surface of the selected weight. The device heretofore described is particularly designed to be mass produced with or without a weight thereto attached.

In one preferred embodiment wherein the weight is not attached to the tabs heretofore described, each tab is provided with a covering portion on its adhesive side to preserve and protect the adhesive composition for future use. In an alternate embodiment of the invention wherein a weight is provided as a constituent part of the device, packaging means, in the form of a wrapper that totally encapsulates the device, may be utilized to preserve the device and maintain it readily available for immediate use. Such packaging is important not only in regard to preventing deterioration of the adhesive composition that might normally occur over a long period of time in the ambient air but also to prevent undesirable deterioration of the water-soluble pellet.

Further advantages and features of the present invention will be apparent from the ensuing detailed description when read with reference to the accompanying drawing.

BRIEF DESCRIPTION OF THE DRAWING

In the accompanying drawing:

FIG. 1 is a perspective view of a self-discarding attachment device constructed in accordance with the present invention;

FIG. 2 illustrates the device of the present invention as it is utilized in combination with a casting plug type of lure;

FIG. 3 illustrates the utilization of the device of the present invention with a different type of sinker element as compared to that which is shown in FIG. 2;

FIG. 4 illustrates how the assembly shown in FIG. 3 would appear when contained in an air tight packaging arrangement;

FIG. 5 illustrates the utilization of the device shown in FIG. 3 wherein the device is connected to a fishing line by means separate from the lure with which the device is utilized;

FIG. 6 illustrates one particular form in which the device of the present invention may be produced;

FIG. 7 is an illustration of packaging means encapsulating the form of the device shown in FIG. 6; and FIG. 8 illustrates an alternate form or modified embodiment of a self-discarding attachment device in accordance with the present invention.

DESCRIPTION OF THE PREFERRED EMBODIMENTS

Referring now to FIG. 1, there is illustrated a self-releasing attachment device 10. The device includes a water-soluble tablet or disc-shaped pellet 11 that is centrally perforated by an opening 11a extending therethrough. A fastening means in the form of a substantially short flexible string or leader 12 extends through the opening 11a and has an attaching or adhering means 13 disposed at each of its ends. The adhering means 13 is preferably in the form of a flexible planar tab or tape segment coated on one side thereof with an adhesive composition. In the form of the device shown in FIG. 1, a covering 14 is provided contiguous to the adhesive side of each of the tabs 13 as a means of preserving the adhesive composition and preventing it from drying out prior to use. It will be noted in FIG. 1 that the pellet 11 is disposed on a barbed fish hook 15. The opening 11a in the pellet 11 is of a size permitting the pellet to be placed as shown on the hook 15 whereby the device, with a weight attached thereto, may be cast on the end of a fishing line used in combination with a reel and fishing rod of any one of the known types such as a fly rod or casting rod.

tabs FIG. 2 a small smoothly rounded stone or pebble 16 constitutes a part of the device 10. The bats 13, in FIG. 2, have been manually pressed to adhere to the surface of the stone 16, and the pellet 11 is engaged to a treble hook 17 depended from a casting plug 18 that is carried at the end of a fishing line 19. FIG. 2 demonstrates the advantage of having the leader 12 extending in a loose slidable arrangement through the perforation 11a of the pellet 11 whereby the weight or pebble 16 is self-aligning relative to the fishing line. By having tabs tabs 13 disposed at approximately the same distance rearwardly from the end of the weight 16, the weight tends to center itself directly behind the casting plug 18 inasmuch as the leader 12 is movable relative to the pellet 11. The foregoing arrangement enables an improved aerodynamic function of the total unit to be cast as compared, for example, to the effect obtainable from simply tying a sinker element or weight to a leader extending laterally from a point along the fishing line.

In FIG. 3 the device of the present invention is illustrated as including a sinker element or casting weight 30 having an elongated form whereby the aerodynamic characteristics of the device 10 are further improved. The sinker element 20 is shown as having a broader cross section oriented toward the pellet 11 and a comparatively narrower tapered outer end to further enhance the casting characteristics of the device 10.

The entire assembly shown in FIG. 3 may be produced and packaged with the pellet 11 folded back against the sinker element 20 for packaging. Such packaging can be inexpensively and simply accomplished by wrapping the assembly of FIG. 3 in a water-impervious material such as waxed paper or flexible metallic foil 21 or other wrapping material and then using an inexpensive tape 22 to close the package, as shown in FIG. 4.

In FIG. 5, the device 10 utilizes the elongated sinker element 20 and is attached to a hook 15 extended laterally from the fishing line 19. A light weight decorative lure or bobber 25 is attached to the end of line 19 by means of a swiveled snap 26. It should be noted that the loose arrangement between the leader 12 and the water soluble pellet 11 allows the elongated sinker element 20 to center itself relative to the direction of force to be applied to the line 19 when the bobber 25 and the device 10 are cast outwardly by the fisherman.

It may be found desirable to produce mass mass quantities of the device 10 in a form substantially as shown in FIG. 1, but with the hook 15 removed therefrom. It is believed that it also may be advantageous to produce an assembly wherein the device 10 includes an inexpensive sinker element already adhered to the tabs 13. Thus, it is anticipated that the assembly shown in FIG. 6 could be prepackaged (as shown in FIG. 7) by wrapping the assembly of FIG. 6 in flexible metallic foil 26 or other air tight wrapping material and closing the package of affixing a tape segment 28 thereto.

As illustrated in FIG. 8 an alternate embodiment of the present invention includes the substitution of a nonsoluble member, such as a tubular rod portion or ring-like element 29. The ring-like element 29 may be split along a helical line whereby the fishing line 19 can be affixed into the hollow opening through the element 29 in a loose fitting slidable arrangement. A large knot can be affixed in the line 19 or a stationary element 31 may be positioned thereon to prevent the slidable element 29 from moving toward the end of the fishing line 19 past a preselected point thereon.

In the assembly of the device 10 shown in FIG. 8, the tabs 13 can be of a controlled size in accordance with the adhering characteristics of the adhesive on the tabs whereby the force required to separate a sinker element, such as element 30, from the tabs 13 will be less than the breaking force required to forceably sever the line 19. Thus, if the sinker element 30 is snagged and held fast by an underwater obstruction when the assembly 10 of FIG. 8 is utilized for bottom fishing or "-still" fishing in deep water, retrieval of the line 19 will result in separation of the sinker element 30 from the line 19 without breaking the fishing line itself.

It is anticipated that particularly small versions of tabs 13 may be utilized in combination with a sinker element in an assembly such as that shown in FIG. 8 so that the sinker element will remain attached as shown to the line 19 when the line is dropped into water for for fishing, but will break away from the tabs 13 when a particularly strong jerking force is manually applied to the line 19 by the fisherman. This would enable the fisherman to use inexpensive discardable sinking elements to carry his baited hooks to the bottom of a deep water pool and then, by applying a jerking force or hard quick pull the fisherman could thereby cause the sinker element to break free from the tabs and permit the baited hook to gradually float upwardly through the water.

Having heretofore described several embodiments of a self-releasing attachment device for fishing, and having particularly pointed out only certain major functional aspects thereof, it should be apparent to those skilled in the art that what has been heretofore described is considered to be those embodiments of the invention now presently preferred. In accordance with the Patent Statutes, changes, modifications and departures may be made from the structure of the invention described and illustrated without actually departing from the true spirit and scope of the invention as particularly defined in the appended claims.

What I believe is new and desire by Letters Patent of the United States is:

1. A self-discarding attachment device enabling increased distance in casting a fishing line, comprising:
   a. A water-soluble member adapted to be attached directly to a fishing hook,
   b. means extending from said water-soluble member for fastening a casting weight thereto,
   c. said water-soluble member also being adapted to maintain its attachment to said hook while it is cast at the end of a fishing line to which said hook is attached,
   d. said water-soluble member being further adapted to deteriorate and thereby release said fastening means and said casting weight from said hook when said hook, with the attachment device thereon, is cast into water,
   e. said water-soluble member being a disc-shaped pellet having a perforation therethrough whereby said attachment to a fishing hook is accomplished by inserting the end of the hook through said perforation and slipping said water-soluble member onto the hook's shank, and f. said perforation being located in said pellet such that the rate of dissolution of said water-soluble member is substantially circumjacently uniform.

2. The device defined in claim 1 wherein said flexible means comprises a leader portion extended through said perforation, and said leader portion has a substantially thin cross-section whereby it fits loosely relative to said member when said member is positioned on the fishing hook.

3. A self-discarding attachment device enabling increased distance in casting a fishing line, comprising:
   a. a water-soluble member adapted to be attached directly to a fishing hook,
   b. means extending from said water-soluble member for fastening a casting weight thereto,
   c. said water-soluble member also being adapted to maintain its attachment to said hook while it is cast at the end of a fishing line to which said hook is attached,
   d. said water-soluble member being further adapted to deteriorate and thereby release said fastening means and said casting weight from said hook when said hook with the attachment device thereon, is cast into water,
   e. said fastening means comprising a string having ends thereof extending from said water-soluble member and a pair of tabs disposed at each end of said string, and
   f. each of said tabs having an adhesive composition on one side thereof rendering said tab pressure-sensitive whereby it may be caused to adhere to said casting weight by manual pressure applied thereto.

4. The device defined in claim 3 wherein each of said tabs is provided with a removable covering contiguous to said adhesive composition whereby said adhesive composition is protected and preserved for future use.

5. A self-discarding attachment device enabling increased distance in casting a fishing line, comprising:
   a. a water-soluble member adapted to be attached directly to a fishing hook,
   b. means extending from said water-soluble member for fastening a casting weight thereto,
   c. said water-soluble member also being adapted to maintain its attachment to said hook while it is cast at the end of a fishing line to which said hook is attached,
   d. said water-soluble member being further adapted to deteriorate and thereby release said fastening means and said casting weight from said hook when said hook, with the attachment device thereon, is cast into water,
   e. said water-soluble member having a perforation therethrough permitting it to be inserted over the point of said hook,
   f. said fastening means comprising a flexible string-like portion that extends through said perforation whereby it has two ends thereof fastened to said casting weight, and
   g. said flexible string-like portion being adapted to be slidable through said perforation in response to shifting of said casting weight whereby said casting weight tends to be self-aligning relative to the fishing line.

* * * * *